Figure 1:
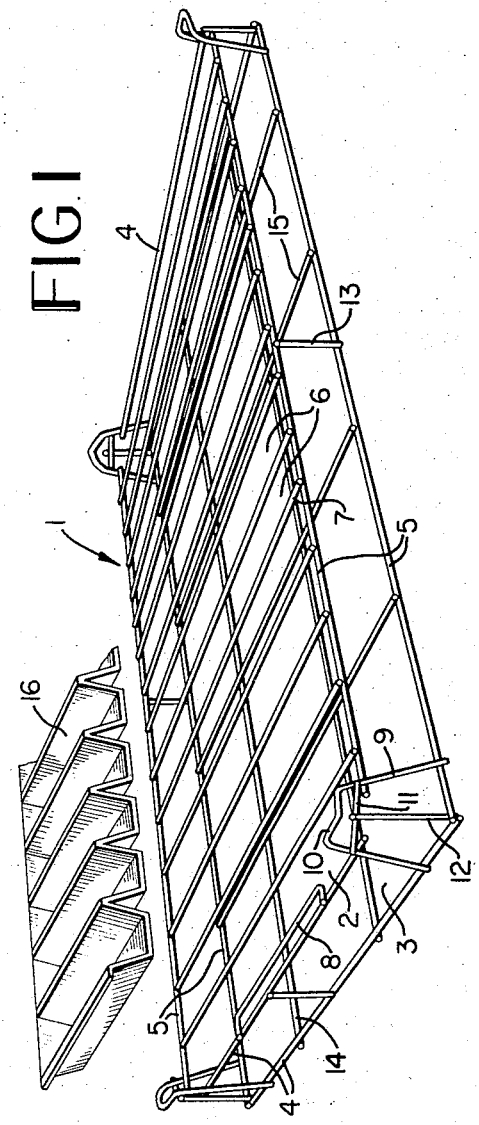

United States Patent [19]
Smit

[11] 3,866,788
[45] Feb. 18, 1975

[54] WIRE CRATE

[75] Inventor: Jacobus Cornelis Smit, Venhuizen, Netherlands

[73] Assignee: N. V. Bekaert S. A., Zwevegem, Belgium

[22] Filed: Feb. 28, 1973

[21] Appl. No.: 336,461

[30] Foreign Application Priority Data
Apr. 10, 1972  Belgium .............................. 781867

[52] U.S. Cl. .................... 220/19, 206/513, 211/71, 211/126, 211/162, 211/181
[51] Int. Cl. ...................... B65d 7/20, B65d 21/00
[58] Field of Search ....... 211/71, 181, 162, 74, 126, 211/133; 220/19; 206/513

[56] References Cited
UNITED STATES PATENTS

| | | |
|---|---|---|
| 2,832,499 | 4/1958 | Maslow .............................. 211/181 |
| 2,889,054 | 6/1959 | Wheeler .............................. 211/181 |
| 3,358,868 | 12/1967 | Purucker .............................. 220/19 |
| 3,378,161 | 4/1968 | Lookabaugh ....................... 206/513 |
| 3,599,558 | 8/1971 | Goldberg .............................. 211/71 |
| 3,784,044 | 1/1974 | Bruggeman et al .................. 220/19 |

*Primary Examiner*—William I. Price
*Assistant Examiner*—Joseph M. Moy
*Attorney, Agent, or Firm*—Shlesinger, Arkwright, Garvey & Dinsmore

[57] ABSTRACT

This invention relates to a wire crate made of wires welded to one another in which to place plant strips, whereby the frame of the upper and base surface consists of four wires running perpendicular to one another.

3 Claims, 2 Drawing Figures

PATENTED FEB 18 1975 3,866,788

WIRE CRATE

Plant strips are longitudinal troughs, whose cross-section is wider at the top than at the bottom. Said cross-section may be a semi-circular, an isosceles trapezoid, etc. The strips or troughs are filled with vegetable earth, artificial fertilizers, etc., and contain seed, bulbs, tubers, etc.

An object of the present invention is to provide a special type of wire crate, which is particularly suited for housing plant strips, whereby these crates, with the plant strips placed in them, can be stacked on top of one another very compactly and solidly, and whereby the sprouting and growth of the young plants is able to take place in the most favorable conditions.

For this, the invention proposes that the upper surface of a wire crate of the type mentioned in the beginning be evenly divided into a number of rectangles by means of regularly spaced, parallel longitudinal or cross-wires, whereby the distance between said longitudinal or cross-wires is equal or practically equal to the width of the upper surface of the plant strips to be placed in said rectangles, and that the upper surface by provided with a distance keeper, whereby the distance between this distance keeper and the nearest parallel border wire of the upper surface is equal or practically equal to half the width of the rectangles formed in the upper surface.

By taking care, when stacking the crates according to the invention on top of one another, that for each set of successive crates the distance keepers do not lie under each other, or, in other words, by insuring that the two successive crates are turned 180° with respect to one another, a great advantage is obtained for each set of two successive crates in that the plant strips in the bottom crate are located at the level of the space between two adjacent plant strips in the layer above. This means that the plant strips in the layer above form no obstacle to the sprouting and growth of the young plants in the layer located underneath.

Figure 2:
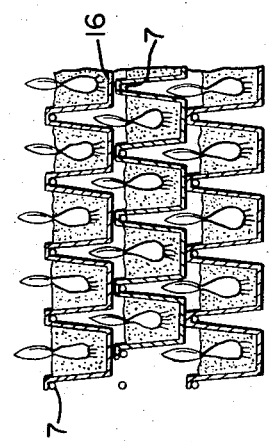

The invention will be explained more in detail in the following description with the help of the relevant drawings in which:

FIG. 1 is a perspective view of a wire crate according to the invention and a part of the plant strips to be placed therein; and FIG. 2 is a cross-sectional view of stacked crates according to the invention with the plant strips placed therein.

The wire crate 1 according to the invention, shown in FIG. 1, fully consists of wires welded to one another. The frame of the upper surface 2 and the base surface 3 of the crate 1 consists of four wires running perpendicular to one another, viz. cross-wires 4 and longitudinal wires 5.

The upper surface 2 of the crate 1 is evenly divided into a number of rectangles 6 by means of regularly spaced and parallel cross-wires 7, which are parallel to the cross-wires 4 of the frame of the upper surface 2.

Moreover, the upper surface 2 is provided with a distance keeper 8, whereby the distance between this distance keeper 8 and the nearest, parallel border wire 4 of the upper surface 2 is equal or practically equal to half the width of the rectangles 6 formed in the upper surface. 2.

The upper surface 2 and the base surface 3 are connected to one another by means of U-shaped braces 9 at the angular points. The upper portion 10 of said braces 9 is bent around over an angle of 90° so that this portion of the braces 9 runs almost parallel to the base and upper surface. The legs of the braces 9 are connected to one another by means of a supporting wire 11, which runs parallel to the upper surface 2 and is located above this upper surface 2 and below the upper portion 10 of the braces 9. These supporting wires 11 form the actual supporting surface upon which to place the crate. The angular points are reinforced by means of upright wires 12 between the supporting wire 10 and the angular point of the frame of the base surface 3. Upright wires 13 are mounted at certain points along the periphery of the crate 1 between the base and upper surface.

The base surface 3 of the crate 1 is reinforced by a number of longitudinal wires 14 and cross-wires 15. These cross-wires 15 are parallel to the cross-wires 7 located in the upper surface 2 and are at the level with the center of the rectangles 6 formed in said upper surface 2.

In FIG. 1, a few strips 16 to be placed in the crate are shown. Preferably the strips 16 are connected to one another so that, when placing the strips 16 in the rectangles 6, these strips are supported by cross-wires 7. The cross-section of these strips 16 is wider at the top than at the base and may, for example, be an isosceles trapezoid, a semi-circle, etc. Said strips 16 are filled with vegetable earth, artificial fertilizers, etc. and contain bulbs, tubers, etc.

By taking care, when stacking the crates filled with strips, that for each set of successive crates, the distance keepers 8 do not lie under one another, a great advantage is obtained in that the plant strips 15 of the bottom crate are at the level of the space between two adjacent plant strips 15 in the layer above, which, for example, clearly appears from the stacked crates as shown in FIG. 2.

It is evident that within the framework of this invention variant embodiments are possible. Thus, it is impossible that the upper surface 2 may be evenly divided by means of parallel, longitudinal wires instead of cross-wires 7, such as when the plant strips 17 are put in the longitudinal direction of the crate, It is also evident that the distance keeper 8 must be parallel to these longitudinal wires. The distance keeper 8 can also be made in another way than the way shown in FIG. 1. Hence, this distance keeper 8 may, for example, be a full wire between the longitudinal wires 5 of the upper surface 2.

While this invention has been described, it will be understood that it is capable of further modification, and this application is intended to cover any variations, uses and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A wire crate for plant strips and the like comprising:
    a. substantially parallel upper and base surfaces,
    b. each of said surfaces being formed by spaced parallel end and side wire members, c. said upper surface being evenly divided into a plurality of rectangles by means of regularly spaced cross-wires parallel to one of said members and positioned so that the distance between said cross-wires is substantially equal to the width of the upper surface of the plant strips to be placed in said rectangles, d. said upper surface including a distance keeper parallel to said one of said members and said cross wires and positioned between said one of said members and the cross wire nearest thereto so that the distance between said one of said members and said distance keeper is substantially one half of the width of said rectangles, e. whereby when one of said crates is rotated 180° with respect to another of said crates and stacked on said other of said crates, none of the rectangles in said one of said crates will be directly above the rectangles in said other of said crates.

2. A wire crate as in claim 1 and wherein:

said base surface includes a plurality of reinforcing wires parallel to said cross wires and positioned approximately below the centers of the superjacent rectangles.

3. A wire crate as in claim 1 and wherein:

said crate includes corner braces.

* * * * *